United States Patent Office 3,551,564
Patented Dec. 29, 1970

3,551,564
PARENTERAL SULFONAMIDE AND SULFON-
AMIDE POTENTIATOR COMBINATIONS
Heinrich Kläui and Walter Rehm, Riehen, Switzerland,
assignors to Hoffmann-La Roche Inc., Nutley, N.J., a
corporation of New Jersey
No Drawing. Filed Apr. 28, 1967, Ser. No. 634,472
Claims priority, application Switzerland, May 9, 1966,
6,716/66
Int. Cl. A61k 27/00
U.S. Cl. 424—229                                14 Claims

ABSTRACT OF THE DISCLOSURE

Parenteral solutions containing a sulfonamide, for example, 5-methyl-3-sulfanilamido-isoxazole; 2,4-dimethoxy-6-sulfanilamido-pyrimidine; 5,6-dimethoxy-4-sulfanilamido-pyrimidine, or the like, and a pyrimidine-type potentiator, for example, 2,4-diamino-5-(3,4,5-trimethoxybenzyl)pyrimidine; 2,4-diamino-5-(3,4-dimethoxybenzyl)pyrimidine; 2,4-diamino-5-(3,4-dimethoxy-6-methylbenzyl)pyrimidine or the like, are disclosed.

BACKGROUND OF THE INVENTION

The simultaneous injection of several medicaments which are not combined in a single combination product poses a considerable problem. Apart from the discomfort caused by the administration of two or more injections instead of one and the addition technical expenditures connected therewith, there exists the serious disadvantage that the optimal dosage ratio of the individual components frequently cannot be adhered to precisely enough. These considerations apply not only to injections per se but apply also separately to infusions, such as intravenous continuous drip infusions.

Thus, when it is desirable and necessary to administer several medicaments by the parenteral route, the availability of combination products embodying said medicaments is essential. However, because of the incompatability problems frequently encountered in preparing such combination products, as in the case of sulfonamides and pyrimidine-type sulfonamide potentiators, the development of such combination products is impossible without the concurrent development of special techniques.

BRIEF SUMMARY OF THE INVENTION

This invention relates to novel, parenteral compositions comprising a mixture of a medicinally acceptable salt of a sulfonamide such as 5,6-dimethoxy-4-sulfanilamido-pyrimidine; 3,4-dimethyl-5-sulfanilamido-isoxazole; 5-methyl-3-sulfanilamido-isoxazole; 2,4-dimethoxy-6-sulfanilamido-pyrimidine; 4,6-dimethyl-2-sulfanilamido-pyrimidine or the like, dissolved in water and a sulfonamide potentiator of the formula

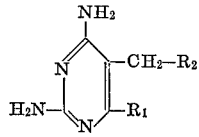

wherein $R_1$ is hydrogen or lower alkyl, and $R_2$ is aryl, such as phenyl substituted by one or more lower alkoxy, preferably methoxy or isobutoxy, amino, nitro, halogen, preferably chlorine, lower alkyl, preferably methyl or trifluoromethyl, and hydroxy groups, particularly preferred is aryl of the formula

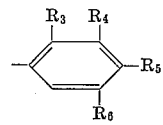

wherein $R_3$ and $R_4$ are independently selected from the group consisting of hydrogen, halogen, preferably chlorine, lower alkyl and lower alkoxy, and $R_5$ and $R_6$ are independently selected from the group consisting of halogen, preferably chlorine or bromine, lower alkyl and lower alkoxy, dissolved in a water-miscible organic solvent.

DETAILED DESCRIPTION

In the administration of potentiated sulfonamides, the observance of a definite ratio of sulfonamide to potentiator is particularly important, for reasons of activity and also for toxicologic considerations. Therefore, the feasibility of administering a sulfonamide and sulfonamide potentiator combination in a single injection is a pressing requirement of the practice. Furthermore, while chemotherapeutic substances are very often administered orally in human medicine, and injections are necessary only when an especially rapid action is of the essence, the veterinary surgeon prefers, at least for the initial treatment, the injection to the oral administration of a medicament for therapeutic purposes. The described problem is particularly acute in veterinary medicine and, therefore, the availability of a combination product is especially desirable and perhaps essential.

The preparation of the injectable solutions which contain in a single preparation both sulfonamides and also basically reacting sulfonamide potentiators, has so far been impossible due to the specific solubility properties of the two components. While the sulfonamides form suitable water soluble salt only with bases, the basically reacting sulfonamide potentiators form suitable water soluble salts only with acids. Therefore, the mixing of solutions of the two components results in precipitates which make the preparation of injectable solutions impossible.

It has now been found that one can prepare suitable injectable combination products when, according to the present invention, a medicinally acceptable water soluble salt of a sulfonamide is dissolved in water and combined with a solution of a basically reacting sulfonamide-potentiator in a medicinally acceptable water-miscible organic solvent to obtain a clear and precipitate-free solution. At the same time, it has been discovered that the aqueous solution of the sulfonamide may be diluted with relatively large amounts of such organic solvents without precipitating the sulfonamide. This effect remains largely the same, even when the organic solvent contains active principals, such as sulfonamide potentiators which are difficultly soluble or insoluble in water.

The invention is not limited to the use of a specific sulfonamide. It is essential, however, that with bases they form salts which are soluble in water in satisfactory concentration at a physiologically permissible pH value. Usually the pH value is in the range between 8 and 11. Substances that can be used to form such salts are, for example, all alkalis, preferably sodium hydroxide, ammonium hydroxide and organic amines, preferably alkanol amines, such as ethanol amine, tri(hydroxymethyl)aminomethane and particularly diethanol amine.

Suitable sulfonamides are above all, 5,6-dimethoxy-4-sulfanilamido - pyrimidine; 3,4-dimethyl-5-sulfanilamido-isoxazole; 5 - methyl - 3 - sulfanilamido-isoxazole; 2,4-dimethoxy-6-sulfanilamido-pyrimidine (also known as N'-(2,6-dimethoxy-4-pyrimidinyl) sulfanilamide) and 4,6-dimethyl-2-sulfaniliamido-pyrimidine. These sulfonamides are known for their antibacterial activity in animals.

The field of sulfonamide potentiators has attained great importance in recent years. Moreover, their development as yet seems not to have been concluded. In the foreground of interest at this time are the basic sulfonamide potentiators which include the group of pyrimidine derivatives of the formula

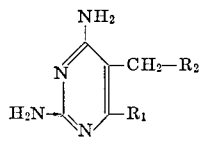

wherein $R_1$ is hydrogen or a lower alkyl group, and $R_2$ is an aryl group such as phenyl substituted by one or more lower alkoxy, preferably methoxy and isobutoxy; amino; nitro; halogen, preferably chlorine; lower alkyl, preferably methyl and trifluoromethyl; and hydroxy groups, particularly preferred aryl is of the formula

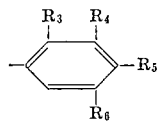

wherein $R_3$ and $R_4$ are independently selected from the group consisting of hydrogen, halogen, preferably chlorine and bromine, lower alkyl and lower alkoxy; and $R_5$ and $R_6$ are independently selected from the group consisting of halogen, preferably chlorine or bromine, lower alkyl and lower alkoxy.

Preferred potentiators are 2,4-diamino-5-(3,4-dimethoxybenzyl)pyrimidine;
2,4-diamino-5-(3,4,5-trimethoxybenzyl)pyrimidine;
2,4-diamino-5-(3,4,6-trimethoxybenzyl)pyrimidine;
2,4-diamino-5-(3,4-dimethoxy-6-methylbenzyl) pyrimidine and
2,4-diamino-5-(4-chlorobenzyl)-6-ethyl-pyrimidine These pyrimidines are known for their potentiation of sulfonamides in the treatment of animals.

In accordance with the process of the invention, the salt of the sulfonamide is conveniently dissolved in as little water as possible. Obviously, it is possible to combine the process for preparing the sulfonamide salt with the process for preparing the solution. Usually, the sulfonamide concentration, based on the combination product, is from about 1 to about 40 percent (all percentages in this application mean w./v. percentages), preferably from about 10 to about 30 percent.

The sulfonamide potentiator can be dissolved conveniently in a medicinally acceptable organic water-miscible solvent with the aid of heat. Examples of such solvents are the polyethyleneglycol ethers of tetrahydrofurfuryl alcohol with about 3 moles of ethylene oxide per mole of alcohol, dimethylformamide, dimethyl sulfoxide, dimethylacetamide, diethylacetamide, 1,2-propylene glycol, di(1,2-propylene glycol) and 1,3-butylene glycol. Additional solvents which have proven themselves to be particularly well suited are glycerin formal (25 percent 4-hydroxy methyl-1,3-dioxolane and 75 percent 5-hydroxy-1,3-dioxane) and polyethyleneglycols containing 2–15 ethylene oxide groups, preferably diethyleneglycol. The concentration of the sulfonamide potentiator in the combination product is usually from about 1 to about 10 percent, preferably from about 1 to about 5 percent.

The combination product contains from about 5 to about 50 percent of water and from about 30 to about 80 percent of organic solvent. In order to obtain certain desirable properties, for example, increase of the preservative property, lowering of the viscosity, improvement of the stability, improvement of the tolerance through the addition of local anesthetic components, it is often advisable to add supplementary adjuvant substances such as ethanol, benzyl alcohol, butylated hydroxyanisole, sodium sulfite sodium bisulfite and the like.

The quantity of the parenteral solutions of the invention which can be injected into a host for the treatment of bacterial and protozoan diseases varies according to the species of the host its age general condition of health severity and type of infection. Conveniently from about 1 ml. to about 1000 ml. of a parenteral solution containing about 5 percent w./v. of the sulfonamide potentiator and about 25 percent w./v. of the sulfonamide can be employed. The frequency with which the parenteral solutions of the invention will be administered to a host will vary depending upon the quantity of active medicaments present therein and the needs and requirements of the host. Under ordinary circumstances however, up to about 200 mg./kg. of the sulfonamide and up to about 150 mg./kg. of the basic sulfonamide potentiator in combination can be administered daily in several dosages. It is to be understood, however, that the mentioned ranges are in no sense critical and the dosages can be adjusted in accordance with the needs of the host.

The combination products of the invention is primarily intended for parenteral use. However, it can be used orally, for example, as by the addition thereof to drinking water.

The following examples further illustrate this invention. It is to be noted that all temperatures are in degrees centigrade, unless otherwise specified, and all percentages mean w./v. percentages.

EXAMPLE 1

An injectable solution was prepared as follows:

(a) Ten grams of 2,4-dimethoxy-6-sulfanilamino-pyrimidine, 0.3 g. of diethanolamine and 1.3 g. of sodium hydroxide were dissolved in 20 cc. of distilled water with heating to a temperature of 75°.

(b) Two grams of 2,4-diamino-5-(3,4-dimethoxy-6-methylbenzyl)pyrimidine were dissolved in a mixture of 10 g. of absolute alcohol, 10 g. of dimethylacetamide and 10 g. of polyglycol (400) with heating to a temperature of 75°. [Polyglycol (400) as used herein is polyethylene glycol with an average molecular weight of 400.]

Thereafter, solutions (a) and (b) were mixed, diluted to a volume of 100 cc. with polyglycol (400) and sterilized by filtration.

EXAMPLE 2

An injectable solution was prepared as follows:

(a) Ten grams of 5-methyl-3-sulfanilamido-isoxazole and 4.2 g. of diethanolamine were dissolved in 20 cc. of distilled water with heating to a temperature of 60°.

(b) Two grams of 2,4-diamino-5-(3,4-dimethoxy-5-methylbenzyl)pyrimidine were dissolved in a mixture of 10 g. of absolute alcohol, 10 g. of dimethylacetamide and 45 g. of polyglycol (400) with heating up to a temperature of 75°.

Thereafter, solutions (a) and (b) were mixed, diluted to a volume of 100 cc. with polyglycol (400) and sterilized by filtration.

EXAMPLE 3

An injectable solution was prepared as follows:

(a) 20.4 g. of 5,6-dimethoxy-4-sulfanilamido-pyrimidine, 2.7 g. of sodium hydroxide and 0.3 g. of diethanolamine were dissolved in 12 cc. of distilled water with heating up to a temperature of 60°.

(b) Two grams of 2,4-diamino-5-(3,4,5-trimethoxybenzyl)pyrimidine were dissolved in about 50 g. of 1,2-propylene glycol with heating up to a temperature of 80°.

Thereafter, solutions (a) and (b) were mixed, diluted to a volume of 100 cc. with 1,2-propylene glycol and sterilized by filtration.

EXAMPLE 4

An injectable solution was prepared as follows:

(a) 30.6 g. of 5,6-dimethoxy-4-sulfanilamino-pyrimidine, 4 g. of sodium hydroxide, and 0.3 g. of diethanolamine were dissolved in 20 cc. of distilled water with heating to a temperature of 60°.

(b) Three grams of 2,4-diamino-5-(3,4,5-trimethoxybenzyl)pyrimidine were dissolved in 45 g. of polyglycol (400) with heating to a temperature of about 85°.

Thereafter, solutions (a) and (b) were mixed, diluted to a volume of 100 cc. with polyglycol (400) and sterilized by filtration.

EXAMPLE 5

An injectable solution was prepared as follows:

(a) 20.4 g. of 5,6-dimethoxy-4-sulfanilamido-pyrimidine, 2.7 g. of sodium hydroxide and 0.3 g. of diethanolamine were dissolved in 10 cc. of distilled water with heating to a temperature of 70°.

(b) 4.08 g. of 2,4-diamino-5-(3,4,5-trimethoxybenzyl)pyrimidine were dissolved in a mixture of 10 g. of absolute alcohol, 10 g. of dimethylacetamide and 45 g. of polyglycol (400) with heating to a temperature of 75°.

Thereafter, solutions (a) and (b) were mixed, diluted to a volume of 100 cc. with polyglycol (400) and sterilized by filtration.

EXAMPLE 6

An injectable solution was prepared as follows:

(a) 21.8 g. of the sodium salt of 4,6-dimethyl-2-sulfanilamido-pyrimidine were dissolved in 20 cc. of distilled water with heating to a temperature of 60°.

(b) 2.04 g. of 2,4-diamino-5-(3,4,5-trimethoxybenzyl)pyrimidine were dissolved in a mixture of 10 g. of absolute alcohol, 10 g. of diethylacetamide and 40 g. of polyglycol (400) with heating to a temperature of 75°.

Thereafter, solutions (a) and (b) were mixed, diluted to a volume of 100 cc. with polyglycol (400) and sterilized by filtration.

EXAMPLE 7

An injectable solution was prepared as follows:

(a) Ten g. of 5,6-dimethoxy-4-sulfanilamido pyrimidine, 0.3 g. of dimethylamine and 1.3 g. of sodium hydroxide were dissolved in 40 cc. of distilled water with heating to a temperature of 50°.

(b) Two grams of 2,4-diamino-5-(3,4,5-trimethoxybenzyl)pyrimidine were dissolved in 50 g. of glycerin formal with heating to a temperature of 50°.

Thereafter, solutions (a) and (b) were mixed, diluted to a volume of 100 cc. with glycerin formal and sterilized by filtration.

EXAMPLE 8

An injectable solution was prepared as follows:

(a) 20.4 g. of 2,4-dimethoxy-6-sulfanilamido-pyrimidine, 0.3 g. of diethanolamine and 2.7 g. of sodium hydroxide were dissolved in 10 cc. of distilled water with heating to a temperature of 65°.

(b) 4.08 g. of 2,4-diamino-5-(3,4,5-trimethoxybenzyl)pyrimidine were dissolved in a mixture of 10 g. of absolute alcohol, 10 g. of dimethylacetamide and 45 g. of diethylene glycol with heating to a temperature of 70°.

Thereafter, solutions (a) and (b) were mixed, diluted to a volume of 100 cc. with diethylene glycol and sterilized by filtration.

EXAMPLE 9

An injectable solution was prepared as follows:

(a) 20.4 g. of 5,6-dimethoxy-4-sulfanilamido-pyrimidine and 2.8 g. of sodium hydroxide were dissolved in 10 cc. of distilled water with heating to a temperature of 70°.

(b) 4.08 g. of 2,4-diamino-5-(3,4,5-trimethoxybenzyl)pyrimidine were dissolved in a mixture of 10 g. of absolute alcohol and 50 g. of the polyethyleneglycolether of tetrahydrofurfuryl alcohol [about 3 moles of ethylene oxide per mole of alcohol] with heating to a temperature of 70°.

Thereafter, solutions (a) and (b) were mixed, diluted to a volume of 100 cc. with the polyethyleneglycolether of tetrahydrofurfuryl alcohol and sterilized by filtration.

EXAMPLE 10

An injectable solution was prepared as follows:

(a) Ten grams of 5,6-dimethoxy-4-sulfanilamido-pyrimidine and 1.4 g. of sodium hydroxide were dissolved in 10 cc. of distilled water with heating to a temperature of 55°.

(b) One gram of 2,4-diamino-5-(3,4-dimethoxybenzyl)pyrimidine were dissolved in 65 g. of dimethylformamide with heating to a temperature of 85°.

Thereafter, solutions (a) and (b) were mixed, diluted to a volume of 100 cc. with di-(1,2-propylene glycol) and sterilized by filtration.

EXAMPLE 11

An injectable solution was prepared as follows:

(a) 20.4 g. of 5,6-dimethoxy-4-sulfanilamido-pyrimidine and 2.8 g. of sodium hydroxide were dissolved in 10 cc. of distilled water with heating to a temperature of 70°.

(b) Two grams of 2,4-diamino-5-(3,4,5-trimethoxybenzyl) pyrimidine were dissolved in 60 g. of di-(1,2-propylene glycol) with heating to a temperature of 70°.

Thereafter, solutions (a) and (b) were mixed, diluted to a volume of 100 cc. with di-(1,2-propylene glycol) and sterilized by filtration.

EXAMPLE 12

An injectable solution was prepared as follows:

(a) Ten grams of 5,6-dimethoxy-4-sulfanilamido-pyrimidine, 0.2 g. of diethanolamine and 1.35 g. of sodium hydroxide were dissolved in 5 cc. of distilled water with heating to a temperature of 75°.

(b) One gram of 2,4-diamino-5-(3,4-dimethoxybenzyl) pyrimidine were dissolved in 70 g. of glycerin formal with heating to a temperature of 75°.

Thereafter, solutions (a) and (b) were mixed, diluted to a volume of 100 cc. with glycerin formal and sterilized by filtration.

EXAMPLE 13

An injectable solution was prepared as follows:

(a) 40 g. of 5,6-dimethoxy-4-sulfanilamido-pyrimidine and 5.6 g. of sodium hydroxide were dissolved in 20 cc. of distilled water with heating to a temperature of 80°.

(b) 2 g. of 2,4-diamino-5-(3,4,5-trimethoxybenzyl) pyrimidine were dissolved in a mixture of 2 g. of benzyl alcohol and 40 g. of glycerin formal with heating to a temperature of 70°.

Thereafter, solutions (a) and (b) were mixed, diluted to 100 cc. with glycerin formal and sterilized by filtration.

EXAMPLE 14

An injectable solution was prepared as follows:

(a) 25.5 g. of 5,6 - dimethoxy - 4 - sulfanilamido-pyrimidine, 3.35 g. of sodium hydroxide and 3 g. of diethanolamine were dissolved in 13 cc. of distilled water with heating to a temperature of 75°.

(b) 5.1 g. of 4,5 - diamino - 5 - (3,4,5 - trimethoxybenzyl)pyrimidine were dissolved in a mixture of 8 g. of absolute alcohol, 2 g. of benzyl alcohol and 50 g. of glycerin formal with heating to a temperature of 60°.

Thereafter, solutions (a) and (b) were then mixed, diluted to a volume of 100 cc. with glycerin formal and sterilized by filtration.

EXAMPLE 15

An injectable solution was prepared as follows:

(a) Ten grams of 3,4 - dimethyl - 5 - sulfanilamido-isoxazole and 4 g. of diethanolamine were dissolved in 40 cc. of distilled water with heating to a temperature of 60°.

(b) Two grams of 2,4 - diamino - 5 - (3,4,5 - trimethoxybenzyl)pyrimidine were dissolved in 50 g. of glycerin formal with heating to a temperature of 60°.

Thereafter, solutions (a) and (b) were then mixed, diluted to a volume of 100 cc. with glycerin formal and sterilized by filtration.

What is claimed is:

1. A clear parenteral composition comprising
  (a) from about 1 to about 10 percent w./v. of a medicinally acceptable basic water soluble salt of a sulfonamide;
  (b) from about 5 to about 50 percent w./v. of water;
  (c) from about 1 to about 10 percent w./v. of a basic sulfonamide potentiator of the formula

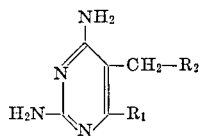

wherein $R_1$ is hydrogen or lower alkyl and $R_2$ is phenyl substituted by one or more lower alkoxy, amino, halogen, or lower alkyl groups; and (d) the remainder being a medicinally acceptable water-miscible organic solvent selected from the group consisting of polyethyleneglycol ethers of tetrahydrofurfuryl alcohol, dimethylformamide, dimethylsulfoxide, dimethylacetamide, diethylacetamide, 1,2-propyleneglycol, di-(1,2-propyleneglycol), 1,3-butylene glycol, glycerin formal, diethylene glycol and polyethylene glycol containing 2–15 ethylene oxide groups.

2. A clear parenteral composition according to claim 1, wherein the sulfonamide is selected from the group consisting of 5,6 - dimethoxy - 4 - sulfanilamido - pyrimidine, 3,4 - dimethyl - 5 - sulfanilamido isoxazole, 5-methyl - 3 - sulfanilamido isoxazole, 2,4 - dimethoxy-6-sulfanilamido - pyrimidine and 4,6 - dimethyl - 2 - sulfanilamido-pyrimidine.

3. A clear parenteral composition according to claim 2, wherein $R_2$ of the basic sulfonamide potentiator is

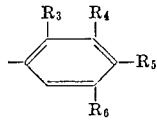

wherein $R_3$ and $R_4$ are independently selected from the group consisting of hydrogen, halogen, lower alkyl, lower alkoxy; and $R_5$ and $R_6$ are independently selected from the group consisting of halogen, lower alkyl and lower alkoxy.

4. A clear parenteral composition according to claim 3, wherein the sulfonamide is 2,4 - dimethoxy - 6 - sulfanilamido-pyrimidine.

5. A clear parenteral composition according to claim 3, wherein the sulfonamide is 5 - methyl - 3 - sulfanilamido isoxazole.

6. A clear parenteral composition according to claim 3, wherein the sulfonamide is 5,6 - dimethoxy - 4 - sulfanilamido-pyrimidine.

7. A clear parenteral composition according to claim 3, wherein the sulfonamide is 2,4 - dimethoxy - 6 - sulfanilamido-pyrimidine.

8. A clear parenteral composition according to claim 3, wherein the sulfonamide potentiator is 2,4 - diamino-5-(3,4-dimethoxy-6-methylbenzyl)pyrimidine.

9. A clear parenteral composition according to claim 3, wherein the sulfonamide potentiator is 2,4 - diamino-5-(3,4,5-trimethoxybenzyl)pyrimidine.

10. A clear parenteral composition according to claim 3, wherein the sulfonamide potentiator is 2,4 - diamino-5-(3,4-dimethoxybenzyl)pyrimidine.

11. A clear parenteral composition according to claim 1, wherein the sulfonamide is 5,6 - dimethoxy - 4 - sulfanilamido-pyrimidine and the basic sulfonamide potentiator is 2,4 - diamino - 5 - (3,4,5 - trimethoxybenzyl) pyrimidine.

12. A clear parenteral composition according to claim 1, wherein the sulfonamide is 2,4 - dimethoxy - 6 - sulfanilamido-pyrimidine and the basic sulfonamide potentiator is 2,4 - diamino - 5 - (3,4 - dimethoxy - 6 - methylbenzyl)pyrimidine.

13. A process for treating an animal, comprising parenterally administering to said animal a therapeutically significant quantity of a composition of claim 1.

14. A process for preparing a parenteral solution containing a sulfonamide and a basic sulfonamide potentiator which comprises dissolving a medicinally acceptable basic water soluble salt of a sulfonamide in water and mixing said solution with a solution of a basic sulfonamide potentiator of the formula

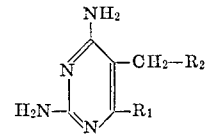

wherein $R_1$ is hydrogen or lower alkyl and $R_2$ is phenyl substituted by one or more lower alkoxy, amino, halogen, or lower alkyl groups dissolved in a medicinally acceptable water-miscible organic solvent selected from the group consisting of polyethyleneglycol ethers of tetrahydrofurfuryl alcohol, dimethylformamide, dimethylsulfoxide, dimethylacetamide, diethylacetamide, 1,2 - propyleneglycol, di - (1,2 - prpoyleneglycol), 1,3, - butylene glycol, glycerin formal, diethylene glycol and polyethylene glycol containing 2–15 ethylene oxide groups, whereby a clear solution is obtained.

References Cited

UNITED STATES PATENTS

| | | |
|---|---|---|
| 3,044,936 | 7/1962 | Achelis et al. |
| 2,909,522 | 10/1959 | Hitchings et al. 260—256.4 |
| 3,249,603 | 5/1966 | Bretschneider et al. 260—239.75 |
| 3,341,541 | 9/1967 | Hoffer 424—251 |

ALBERT T. MEYERS, Primary Examiner

V. D. TURNER, Assistant Examiner

U.S. Cl. X.R.

424—251

UNITED STATES PATENT AND TRADEMARK OFFICE
CERTIFICATE OF CORRECTION

PATENT NO. : 3,551,564
DATED : December 29, 1970
INVENTOR(S) : Heinrich Klaui and Walter Rehm It is certified that error appears in the above-identified patent and that said Letters Patent are hereby corrected as shown below:

Column 7, line 15, claim 1

"10" should be 40

Signed and Sealed this

Twenty-seventh Day of February

[SEAL]

Attest:

RUTH C. MASON
Attesting Officer

DONALD W. BANNER
Commissioner of Patents and Trademarks